US012718151B2

(12) United States Patent
Kunde et al.

(10) Patent No.: US 12,718,151 B2
(45) Date of Patent: Aug. 25, 2026

(54) METAFAAS ARCHITECTURE FOR TRAINING ON SERVERLESS INSTANCES

(71) Applicant: Tata Consultancy Services Limited, Mumbai (IN)

(72) Inventors: Shruti Kunal Kunde, Thane West (IN); Varad Anant Pimpalkhute, Thane West (IN); Rekha Singhal, Thane West (IN)

(73) Assignee: Tata Consultancy Services Limited, Mumbai (IN)

( * ) Notice: Subject to any disclaimer, the term of this patent is extended or adjusted under 35 U.S.C. 154(b) by 662 days.

(21) Appl. No.: 18/295,011

(22) Filed: Apr. 3, 2023

(65) Prior Publication Data

US 2023/0419180 A1 Dec. 28, 2023

(30) Foreign Application Priority Data

Jun. 10, 2022 (IN) ............................. 202221033449

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

2007/0094214 A1* 4/2007 Li ............................ G06N 7/01 706/52
2024/0306604 A1* 9/2024 Rinberg ................. G06N 3/045

FOREIGN PATENT DOCUMENTS

WO WO2021247448 A1 12/2021

OTHER PUBLICATIONS

Yao et al., "Meta-learning with an Adaptive Task Scheduler," in 34 Advances in Neural Info. Processing 7497-7509 (2021). (Year: 2021).*

(Continued)

*Primary Examiner* — Ryan C Vaughn
(74) *Attorney, Agent, or Firm* — Finnegan, Henderson, Farabow, Garrett & Dunner, LLP

(57) ABSTRACT

Hardly any work in literature attempts employing Function-as-a-Service (FaaS) or serverless architecture to accelerate the training or re-training process of meta-learning architectures. Embodiments of the present disclosure provide a method and system for meta learning using distributed training on serverless architecture. The system, interchangeably referred to as MetaFaaS, is a meta-learning based scalable architecture using serverless distributed setup. Hierarchical nature of gradient based architectures is leveraged to facilitate distributed training on the serverless architecture. Further, a compute-efficient architecture, efficient Adaptive Learning of hyperparameters for Fast Adaptation (eALFA) for meta-learning is provided. The serverless architecture based training of models during meta learning enables unlimited scalability and reduction of training time by using optimal number of serverless instances. An analytical model for gradient based meta learning architectures that predicts training time required for the number of FaaS instances is provided which further enables estimating the cost incurred during training models in meta-learning.

9 Claims, 14 Drawing Sheets

(56) References Cited

OTHER PUBLICATIONS

Specification for U.S. Appl. No. 63/220,361. (Year: 2021).*
Raghu, Aniruddh et al., "Rapid learning or feature reuse? Towards understanding the effectiveness of MAML", Machine Learning, Date: Feb. 2021, Publisher: Arxiv, https://arxiv.org/pdf/1909.09157.pdf.
Grafberger, Andreas et al., "FedLess: Secure and Scalable Federated Learning Using Serverless Computing", Computer Science, Date: Nov. 2021, Publisher: Arxiv, https://arxiv.org/pdf/2111.03396.

* cited by examiner (ALFA)

(eALFA)

CCA

METAFAAS ARCHITECTURE FOR TRAINING ON SERVERLESS INSTANCES

PRIORITY CLAIM

This U.S. patent application claims priority under 35 U.S.C. § 119 to: Indian Patent Application number 202221033449, filed on Jun. 10, 2022. The entire contents of the aforementioned application are incorporated herein by reference.

TECHNICAL FIELD

The embodiments herein generally relate to the field of meta learning and, more particularly, to a method and system for meta learning using distributed training on a serverless architecture.

BACKGROUND

A meta-learning approach, also known as learn-to-learn or few-shot paradigm, is ideally suited for training models to generalize on new unseen tasks using just a few examples. In contrast, deep learning works best when a high volume of quality data is available, and performance improves as the data grows. However, a challenge with meta-learning architectures is the large training times incurred, especially by gradient based algorithms (a widely used school of thought in meta-learning) owing to their hierarchical nature. In one of the works in a literature, the idea of distributed training is explored for accelerating meta-learning architectures on a bare-metal setup. This results in a limited scalability of the application and incurs a fixed setup cost. With the advent of cloud providers and their offerings, virtual machines (VMs) can be provisioned to facilitate scalability and accelerate the process of distributed training. However, in meta learning the main problem is that data arrive at intervals and the model needs to be retrained each time. A virtual machine (VM) needs to be continuously provisioned. When there are no incoming data, the VM stays idle or remain under-utilized, while the cost incurred keeps increasing. Function-as-a-Service (FaaS) or serverless architecture is a cost-effective solution, which enables better scalability by adjusting and tuning the number of servers as the business grows. In meta learning, data come in at irregular intervals, and over time the cost incurred when using VMs drastically increases as the VMs need to stay connected, while a serverless setup is cost-effective as one pays only for whatever is used, i.e., unlike traditional cloud providers, FaaS providers do not charge for idle computation time. Another issue is that gradient-based meta-learning algorithms are compute-intensive, thus increasing the overall training time as well studied in the art both on bare-metal and a serverless setup. The technical challenge lies in optimizing meta-learning architectures for compute-efficient performance, to improve the training on the serverless setup.

SUMMARY

Embodiments of the present disclosure present technological improvements as solutions to one or more of the above-mentioned technical problems recognized by the inventors in conventional systems.

For example, in one embodiment, a method for meta learning using distributed training is provided. The method includes initializing a base model to be trained using a serverless architecture and spawning a plurality of serverless instances of the serverless architecture and sharing a copy of the base model with each of the plurality of serverless instances. Further, the method includes generating a trained model via an iterative training process using a gradient-based meta learning approach applied on the copy of the base model via the plurality of serverless instances. The iterative training process comprising: (a) generating and adding to a task pool, a plurality of meta batches each comprising a plurality of tasks, wherein the plurality of tasks in each of the plurality of meta batches is received at irregular time intervals; (b) randomly sampling a meta batch from amongst the plurality of meta batches from the task pool; (c) uniformly distributing and loading the plurality of tasks from the sampled meta batch across the plurality of serverless instances; (d) generating a local model by each of the plurality of serverless instances by training the copy of the base model using a corresponding task loaded on each of the plurality of serverless instances and updating one or more task specific parameters for the copy of the base model at a current level of the iterative training process; (e) computing a plurality of gradients corresponding to each of the local models from the updated one or more task specific parameters at the current level of the iterative training process, wherein the plurality of gradients is stored in a cloud storage-based communication channel; (f) aggregating the plurality of gradients corresponding to the local model; (g) updating the base model in accordance with the aggregated plurality of gradients; and (h) sharing a copy of the updated base model with each of the plurality of serverless instances for successive level of the iterative training process, wherein the iterative training process terminates once the base model converges to provide the trained model.

In another aspect, a system for meta learning using distributed training is provided. The system comprises a memory storing instructions; one or more Input/Output (I/O) interfaces; and one or more hardware processors coupled to the memory via the one or more I/O interfaces, wherein the one or more hardware processors are configured by the instructions to initialize a base model to be trained using a serverless architecture and spawn a plurality of serverless instances of the serverless architecture and sharing a copy of the base model with each of the plurality of serverless instances. Further, the one or more hardware processors are configured to generate a trained model via an iterative training process using a gradient-based meta learning approach applied on the copy of the base model via the plurality of serverless instances. The iterative training process comprising: (a) generating and adding to a task pool, a plurality meta batches each comprising a plurality of tasks, wherein the plurality of tasks in each of the plurality of meta batches is received at irregular time intervals; (b) randomly sampling a meta batch from amongst the plurality of meta batches from the task pool; (c) uniformly distributing and loading the plurality of tasks from the sampled meta batch across the plurality of serverless instances; (d) generating a local model by each of the plurality of serverless instances by training the copy of the base model using a corresponding task loaded on each of the plurality of serverless instances and updating one or more task specific parameters for the copy of the base model at a current level of the iterative training process; (e) computing a plurality of gradients corresponding to each of the local models from the updated one or more task specific parameters at the current level of the iterative training process, wherein the plurality of gradients is stored in a cloud storage-based communication channel; (f) aggregating the plurality of gradients corresponding to the local model; (g) updating the base model in accordance with the aggregated plurality of gradients; and (h) sharing a copy of the updated base model with each of the plurality of serverless instances for successive level of the iterative training process, wherein the iterative training process terminates once the base model converges to provide the trained model.

In yet another aspect, there are provided one or more non-transitory machine-readable information storage mediums comprising one or more instructions, which when executed by one or more hardware processors causes a method for meta learning using distributed training. The method includes initializing a base model to be trained using a serverless architecture and spawning a plurality of serverless instances of the serverless architecture and sharing a copy of the base model with each of the plurality of serverless instances. Further, the method includes generating a trained model via an iterative training process using a gradient-based meta learning approach applied on the copy of the base model via the plurality of serverless instances. The iterative training process comprising: (a) generating and adding to a task pool, a plurality meta batches each comprising a plurality of tasks, wherein the plurality of tasks in each of the plurality of meta batches is received at irregular time intervals; (b) randomly sampling a meta batch from amongst the plurality of meta batches from the task pool; (c) uniformly distributing and loading the plurality of tasks from the sampled meta batch across the plurality of serverless instances; (d) generating a local model by each of the plurality of serverless instances by training the copy of the base model using a corresponding task loaded on each of the plurality of serverless instances and updating one or more task specific parameters for the copy of the base model at a current level of the iterative training process; (e) computing a plurality of gradients corresponding to each of the local models from the updated one or more task specific parameters at the current level of the iterative training process, wherein the plurality of gradients is stored in a cloud storage-based communication channel; (f) aggregating the plurality of gradients corresponding to the local model; (g) updating the base model in accordance with the aggregated plurality of gradients; and (h) sharing a copy of the updated base model with each of the plurality of serverless instances for successive level of the iterative training process, wherein the iterative training process terminates once the base model converges to provide the trained model. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1A:
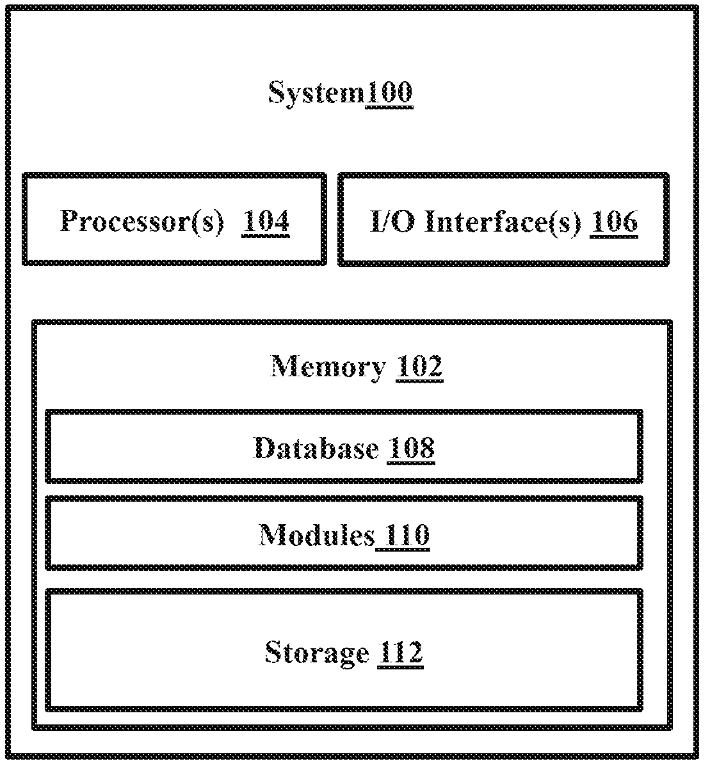
FIG. 1A is a functional block diagram of a system, for meta learning using distributed training on the serverless architecture, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in a computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Hardly any work in literature attempts employing Function-as-a-Service (FaaS) or serverless architecture to accelerate the training or re-training process of meta-learning architectures. Embodiments of the present disclosure provide a method and system for meta learning using distributed training on a serverless architecture. The system, interchangeably referred to as MetaFaaS, is a meta-learning based scalable architecture using a serverless distributed setup. The hierarchical nature of gradient based architectures is leveraged to facilitate distributed training on the serverless architecture. Further, a compute-efficient architecture, efficient Adaptive Learning of hyperparameters for Fast Adaptation (eALFA) for a meta-learning is provided. The serverless architecture-based training of models during meta learning disclosed herein enables unlimited scalability and reduction of training time by using an optimal number of serverless instances. An analytical model for gradient-based meta learning architectures for predicting training time required for a number of FaaS (serverless) instances invoked by the MetaFaaS, hence enables a tool to compute cost incurred during training models in meta-learning.

Referring now to the drawings, and more particularly to FIGS. 1A through 5D, where similar reference characters denote corresponding features consistently throughout the figures, there are shown preferred embodiments and these embodiments are described in the context of the following exemplary system and/or method.

FIG. 1A is a functional block diagram of a system 100, for meta learning using distributed training on a serverless architecture, in accordance with some embodiments of the present disclosure. The system 100 is a distributed environment system implementing serverless architectures such as AWS lambda™. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including virtual machines, fog devices, edge devises comprising laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface(s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110. The plurality of modules 110 includes programs or coded instructions that supplement applications or functions performed by the system 100 for executing different steps involved in the process of meta learning using distributed training on a serverless architecture, being performed by the system 100. The plurality of modules 110, amongst other things, can include routines, programs, objects, components, and data structures, which perform particular tasks or implement particular abstract data types. The plurality of modules 110 may also be used as signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure. Further, the memory 102 includes a database 108. The database (or repository) 108 may include a plurality of abstracted pieces of code for refinement and data that is processed, received, or generated as a result of the execution of the plurality of modules in the module(s) 110. Although the data base 108 is shown internal to the system 100, it will be noted that, in alternate embodiments, the database 108 can also be implemented external to the system 100, and communicatively coupled to the system 100. The data contained within such external database may be periodically updated. For example, new data may be added into the database (not shown in FIG. 1A) and/or existing data may be modified and/or non-useful data may be deleted from the database. In one example, the data may be stored in an external system, such as a Lightweight Directory Access Protocol (LDAP) directory and a Relational Database Management System (RDBMS). The system 100 further includes a storage 112 comprising at least one of an object storage such as S3, database storage such as DynamoDB, a cache storage such as Memcached, or the like that function as the cloud storage-based communication channel. Functions of the components of the system 100 are now explained with reference to steps in flow diagrams in FIG. 2 through FIG. 5D.

Figure 1B:
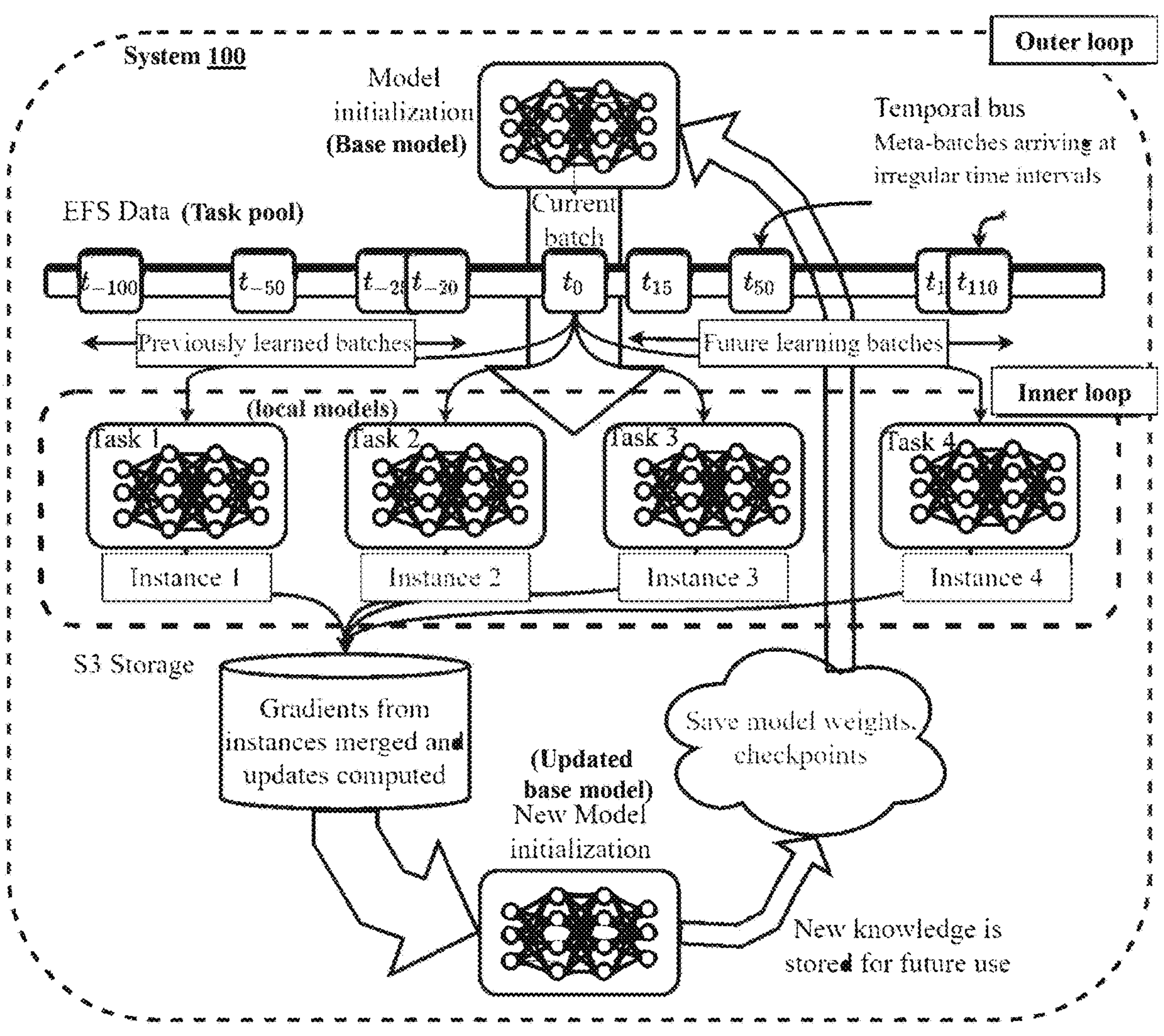
FIG. 1B illustrates an architectural overview of the system of FIG. 1A, alternatively referred to as Meta Function-as-a-Service (MetaFaaS) architecture, in accordance with some embodiments of the present disclosure.

FIG. 1B illustrates an architectural overview of the system of FIG. 1A, alternatively referred to Meta Function-as-a-Service (MetaFaaS) architecture, in accordance with some embodiments of the present disclosure and is explained in conjunction with flow diagram of FIG. 2.

Figure 2A:
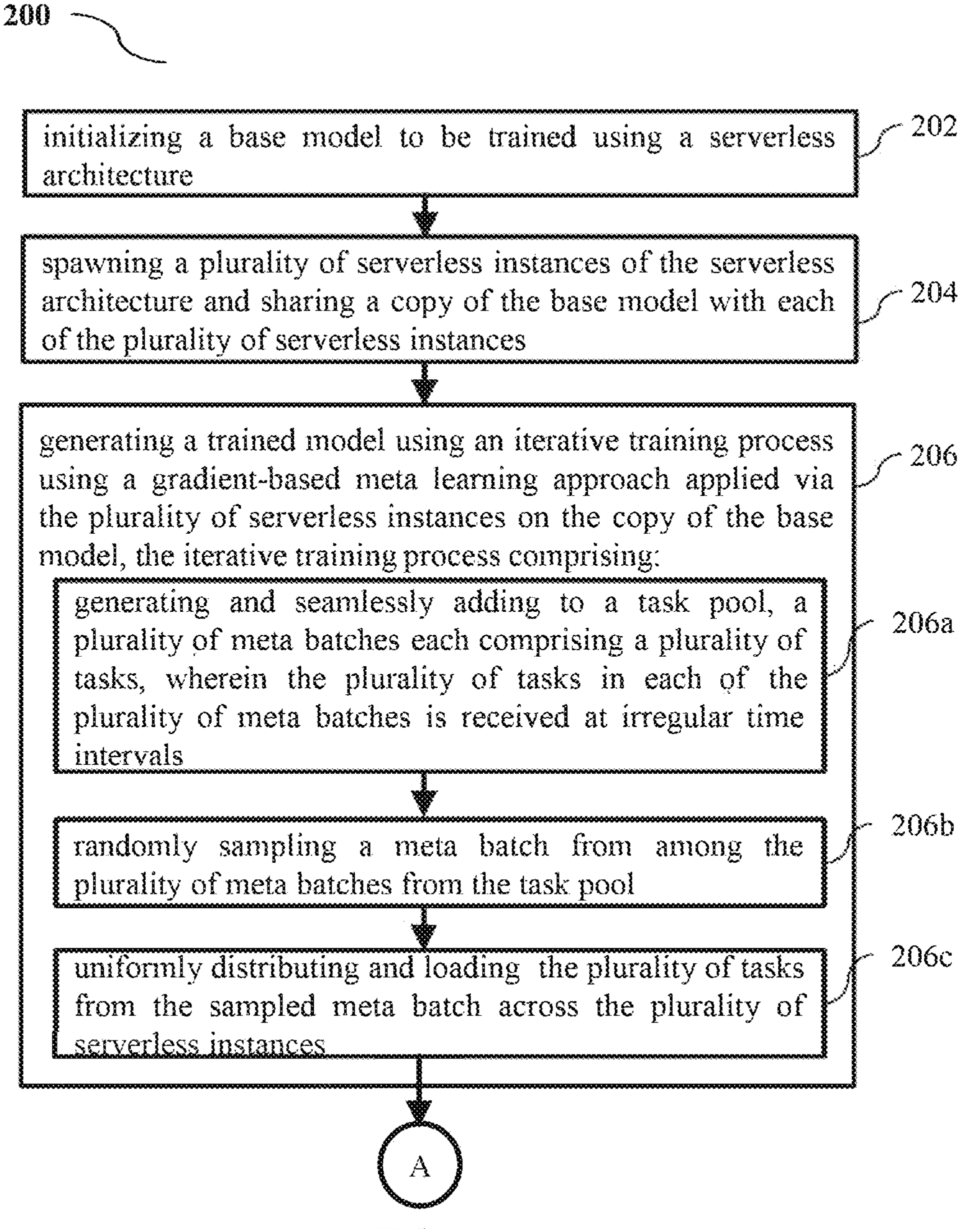
FIGS. 2A through 2B (collectively referred as FIG. 2) is a flow diagram illustrating a method for meta learning using distributed training on serverless architecture, implemented by the system of FIGS. 1A and 1B, in accordance with some embodiments of the present disclosure.
Figure 2B:
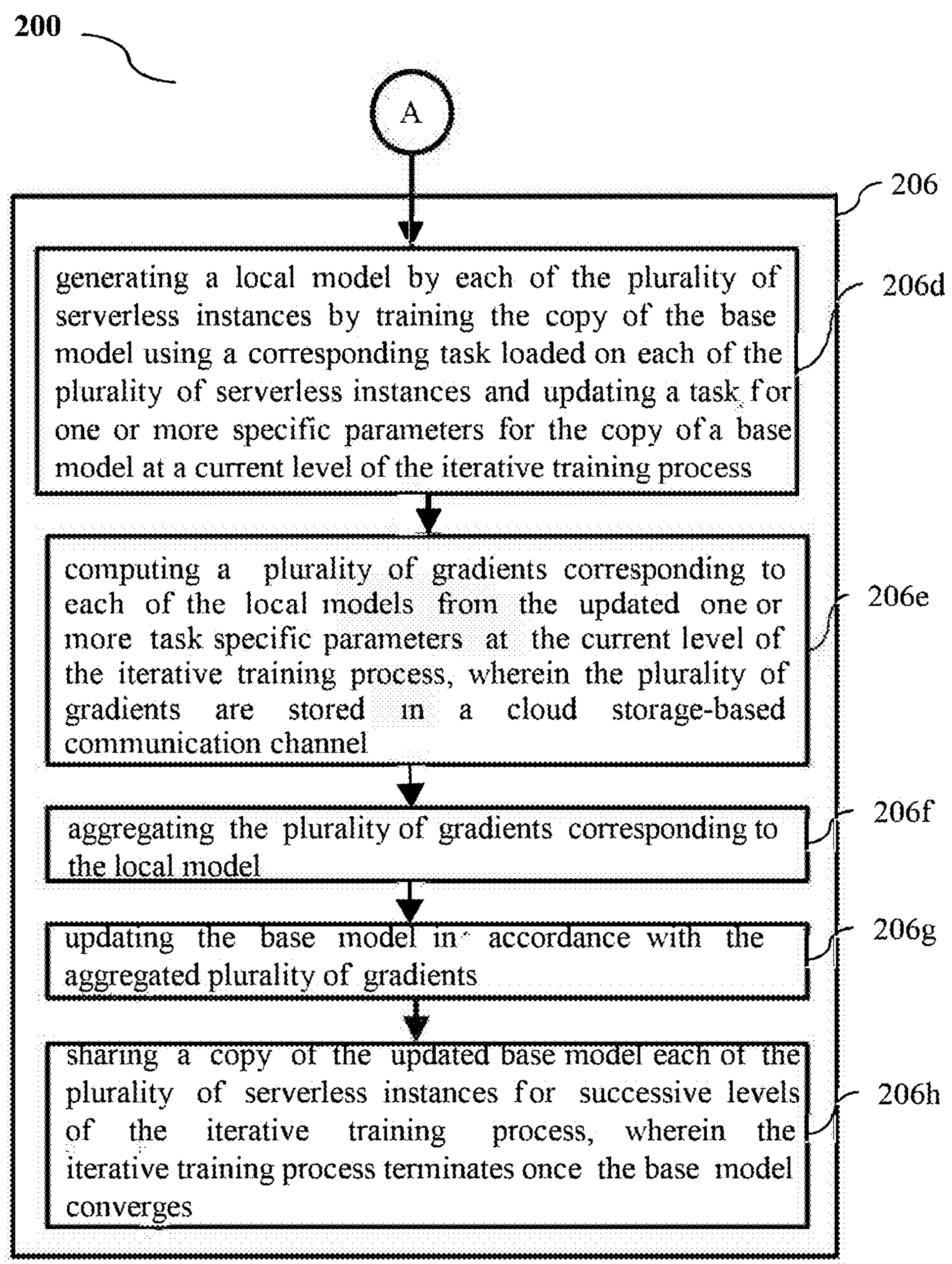

FIGS. 2A through 2B (collectively referred as FIG. 2) are flow diagrams illustrating a method 200 for meta learning using distributed training on serverless architecture, implemented by the system of FIGS. 1A and 1B, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIGS. 1A and 1B and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

FIG. 1B depicts a generic serverless architecture for accelerating meta-learning algorithms. The serverless architecture can be implemented via serverless instances created by AWS lambda™, Azure Functions™ and the like. Tasks are distributed across serverless instances, and a copy of a base model is trained at each serverless instance that is invoked, such as Instance 1, Instance 2 and so on. The cloud storage-based communication channel (storage 112), for example, AWS S3, consolidates gradients (generated local models by training the copy of the base models) from all serverless instances, also referred as workers, merge the gradients, and return the updated model parameters. Data at each worker can be read from any file system on the storage 112. (e.g.: Elastic File System provided by AWS lambda™) The data may be temporal in nature and arrive at irregular intervals and maintained in the EFS task pool in meta batches, as depicted in FIG. 1B. The method 200 further explains the meta learning technique disclosed, which is implemented using the MetaFaaS architecture of FIG. 1B that enables to optimize the training time and achieve scalability.

Referring to the steps of the method 200, at step 202 of the method 200, the one or more hardware processors 104 initialize a base model to be trained using a serverless architecture. The base model selected can be based on the type of tasks the meta learning is conducted for. For example, for image processing tasks, the base model being processed is a Convolutional Neural Networks (CNN) model.

At step 204 of the method 200, the one or more hardware processors 104 spawn or invoke a plurality of serverless instances of the serverless architecture as depicted in FIG. 1B and share a copy of the base model with each of the plurality of serverless instances or workers. Further, at step 206 of the method 200, the one or more hardware processors 104 generate a trained model using an iterative training process using a gradient-based meta learning approach applied via the plurality of serverless instances on the copy of the base model. The iterative training process is explained with steps 206*a* through 206*h* below:

a) Generate and seamlessly adding to the task pool, a plurality of meta batches each comprising a plurality of tasks (206*a*). As well understood, in meta learning the plurality of tasks in each of the plurality of meta batches are received at irregular time intervals and models are trained for every task.
b) From among the plurality of meta batches from the task pool a meta batch is sampled using random sampling techniques known in the art (206*b*). Random sampling approach used herein ensures fairness in task selection. Any other sampling approach may also be applied to select the meta batch for a current instance.
c) The plurality of tasks from the sampled meta batch are uniformly distributed and loading across the plurality of serverless instances (206*c*). Generally, one task from the meta batch is distributed per serverless instance. In any distributed setup there is a limit to the number of instances or nodes that are used for distribution. As the instances increase so does the communication overhead. Hence invoking or spawning of serverless instances is limited to a point where system performance in terms of training time and cost is optimal, i.e., a point where the communication overhead incurred by spawning additional serverless instances starts increasing training time and hence the cost of training. If the performance degrades then additional serverless instances are not spawned, and instead, multiple tasks may be assigned to a single instance.
d) Generate a local model by each of the plurality of serverless instances by training the copy of the base model using a corresponding task loaded on each of the plurality of serverless instances and updating one or more task specific parameters for the copy of the base model at a current level of the iterative training process (206*d*).
e) Compute a plurality of gradients corresponding to each of the local model from the updated one or more task specific parameters at the current level of the iterative training process (206*e*). The plurality of gradients is stored in the cloud storage-based communication channel (storage 112), which enables read-from and write-to action for the workers (serverless instances). This enables communication between the workers to collate the updates in distributed training in the serverless architecture.
f) Once gradients are created, aggregate the plurality of gradients corresponding to the local model (206*f*).
g) Update the base model in accordance with the aggregated plurality of gradients (206*g*).
h) The above step refers to one epoch or one iteration. Thus, for the next epoch, a copy of the updated base model is shared for each of the plurality of serverless instances for successive levels of the iterative training process. Thus, learning from previous iterations is transferred to the next epoch (206*h*). This iterative training process terminates once the base model converges to provide the trained model.

A pseudo code 1 for the meta learning approach disclosed by the method in conjunction with the FIG. 1B is provided below:

Pseudo code 1-Gradient based meta-learning

```
1: for outerloop = 1, 2, . . . , do
2: for innerloop = 1, 2, . . . , metabatchsize do
3: Base model adapts to a new task.
4: Task specific parameters are updated.
5: Compute adapted parameters with gradient descent.
6: end for
7: Update base model/neural network parameters with gradient descent
8: end for
```

Pseudo code 1 outlines a generic view of a gradient based meta learning, which has a hierarchical structure. They usually comprises two loops (1) inner loop (2) outer loop. As mentioned earlier, the meta batch represents the number of tasks that are to be processed in each iteration of the inner loop. A task represents a distribution over input data samples, their corresponding labels, and the loss function. Inside the inner loop, weight updates are collected from each task, and each set of weight updates then updates parameters of the model. The outer loop calculates the loss for each model (from the inner loop), determines gradients and updates the model parameters. MetaFaaS architecture of FIG. 1B depicts multiple workers, i.e., serverless instances. For every inner loop iteration, a task is loaded on the instance and the model copy at that instance is trained. Thus, each worker trains the copy of the base model, interchangeably referred to as a model, using data (tasks) present at the worker.

This differs from distributed training, where a model is trained on each instance with the batch of data that is loaded on the serverless instance at the beginning of all epochs. For each epoch, batches are sampled from the subset of data present at each instance. In contrast, MetaFaaS architecture disclosed herein loads tasks at each instance from the meta-batch. A new meta-batch of tasks is loaded at the end of an epoch. The tasks are distributed across workers. Serverless instances cannot communicate with each other, hence the gradients are consolidated using any storage (e.g., S3 in one implementation) mechanism. Model parameters are updated (outer loop) and updated copies of the model parameters are sent to all workers. This signifies the end of an epoch (also known as the outer loop). In this manner, the model is trained to convergence.

Figure 3A:
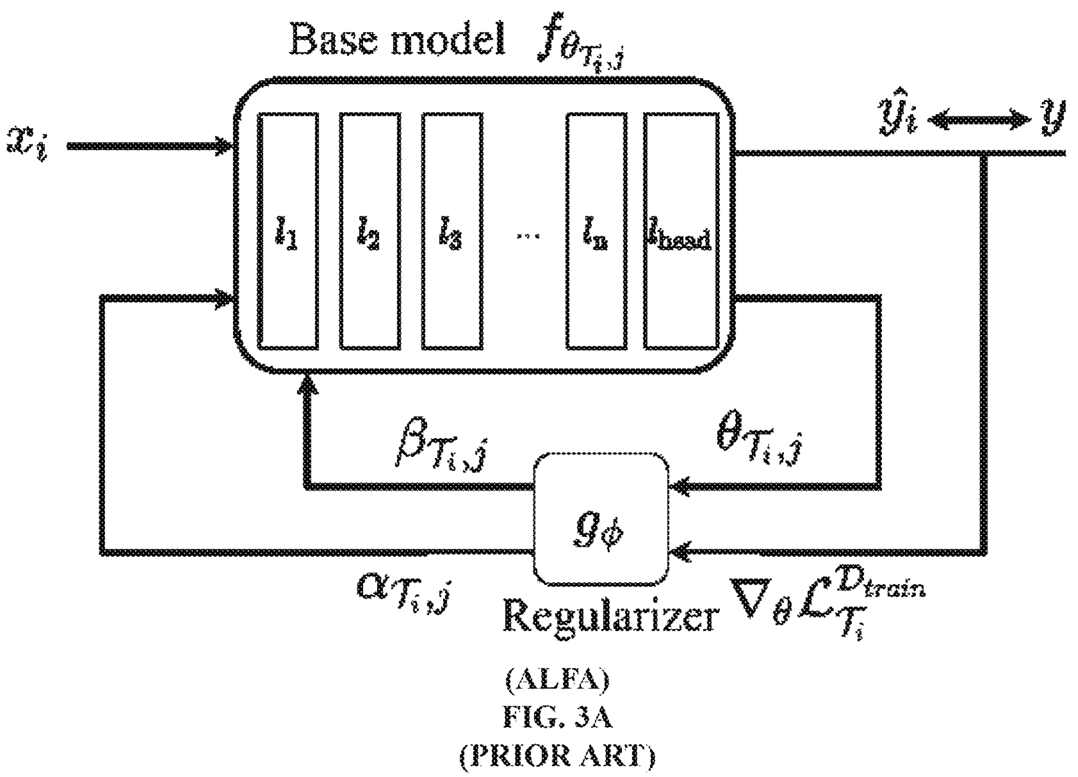
FIG. 3A depicts conventional Adaptive Learning of hyperparameters for Fast Adaptation (ALFA) technique for meta learning.
Figure 3B:
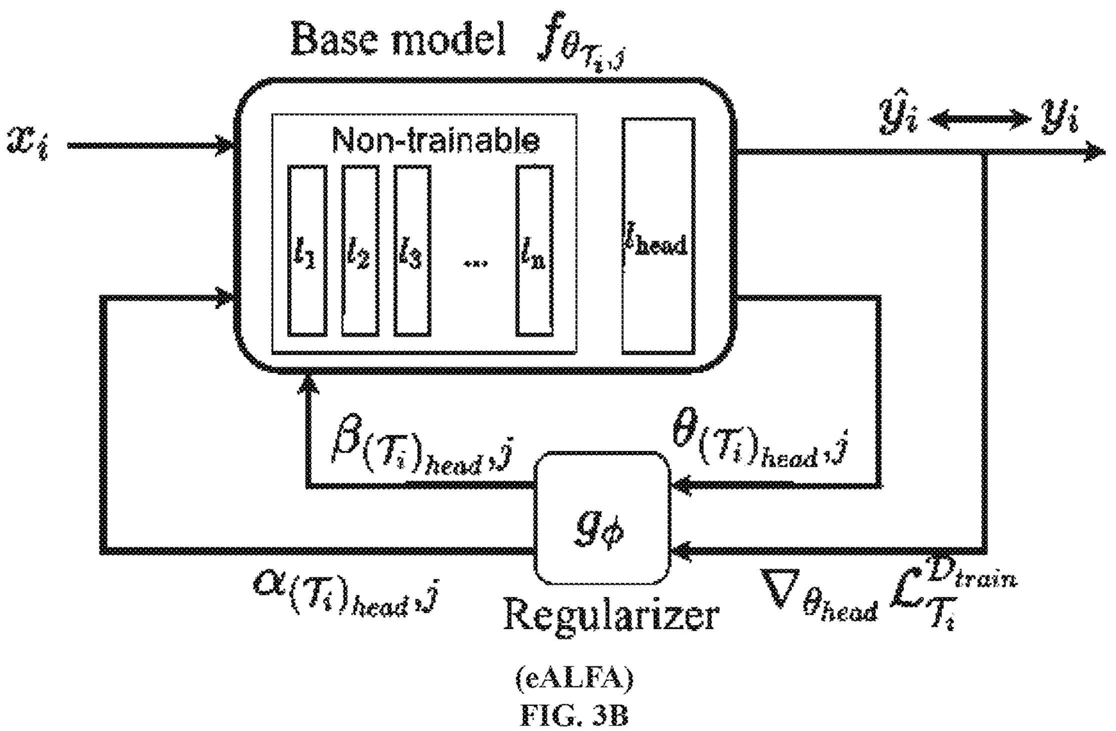
FIG. 3B depicts modified ALFA, referred to as an efficient ALFA (eALFA) technique for meta learning, in accordance with some embodiments of the present disclosure.
Figure 3C:
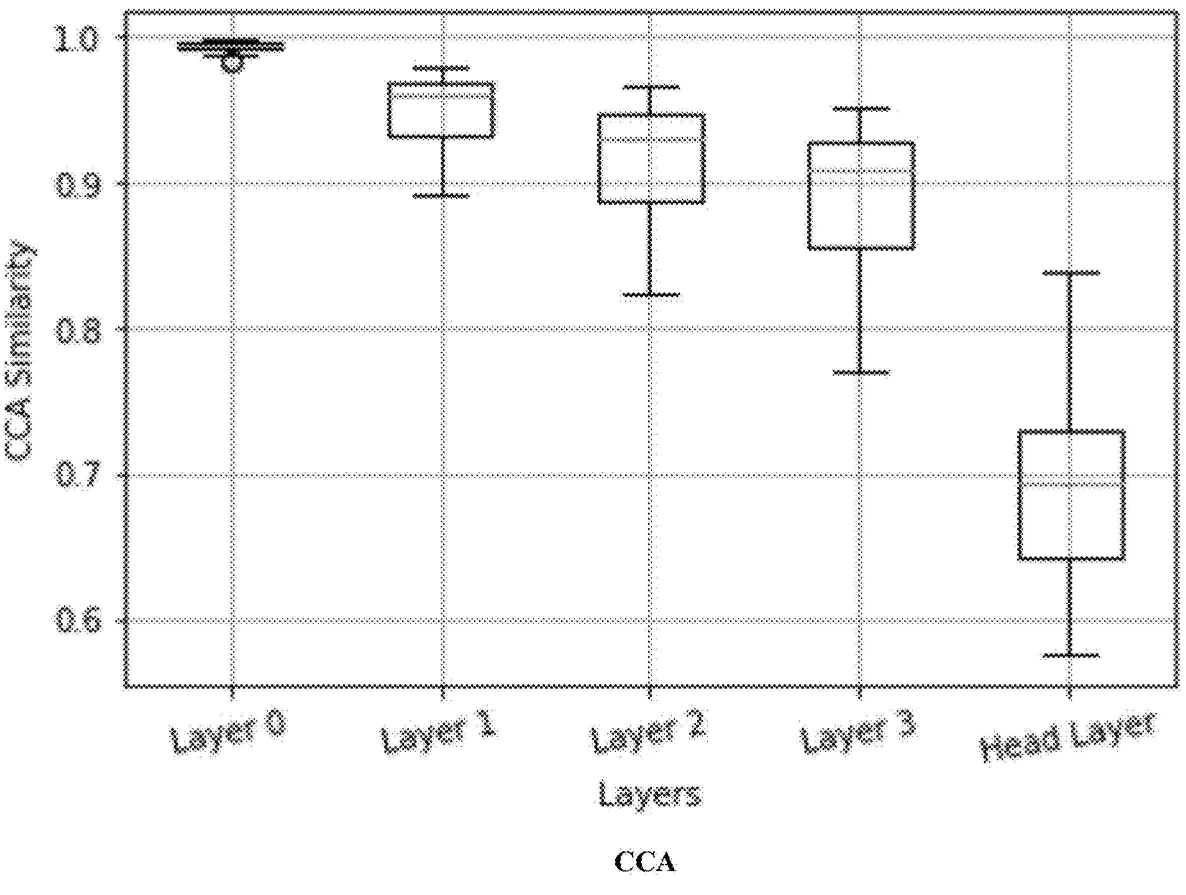
FIG. 3C depicts validation of the eALFA in comparison with the traditional ALFA for providing time efficient training in meta learning using a CCA similarity technique, in accordance with some embodiments of the present disclosure.
Figure 4A:
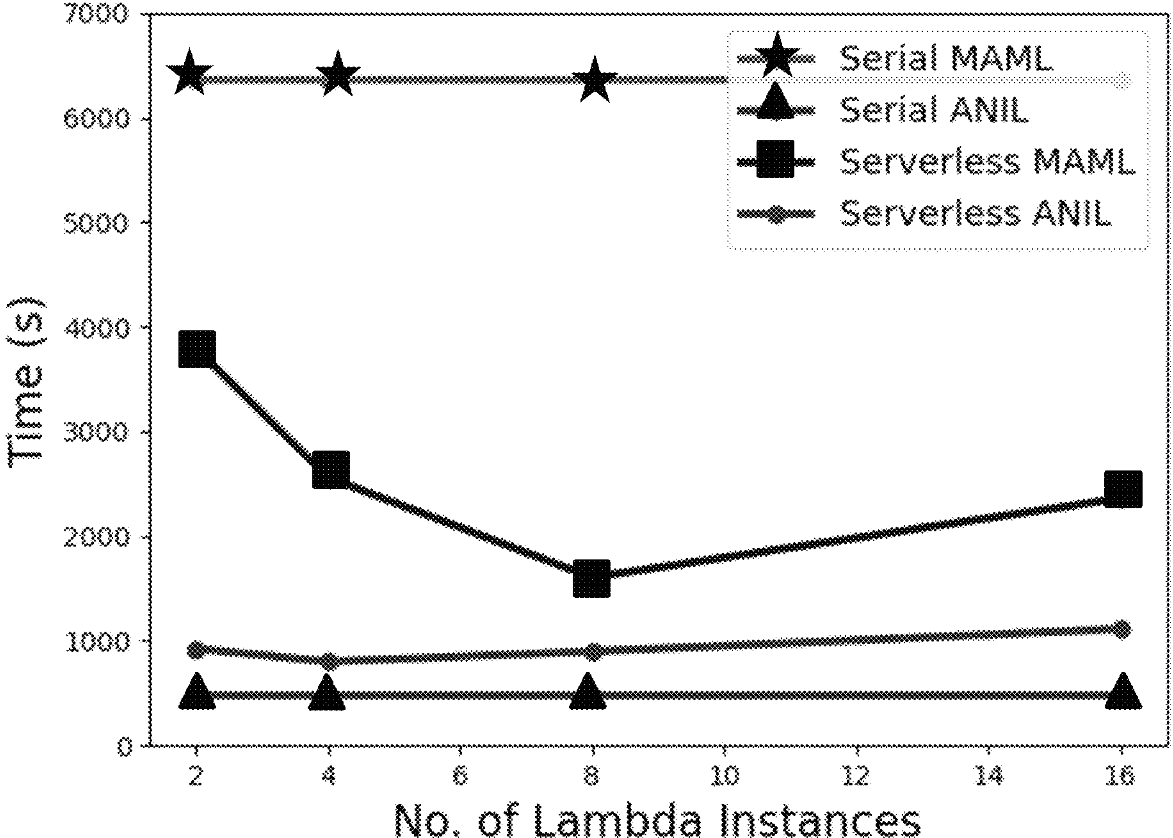
FIGS. 4A through 4D illustrates comparison of performance of meta-learning algorithms on the FaaS (serverless architecture) and serial setup, in accordance with some embodiments of the present disclosure.
Figure 4B:
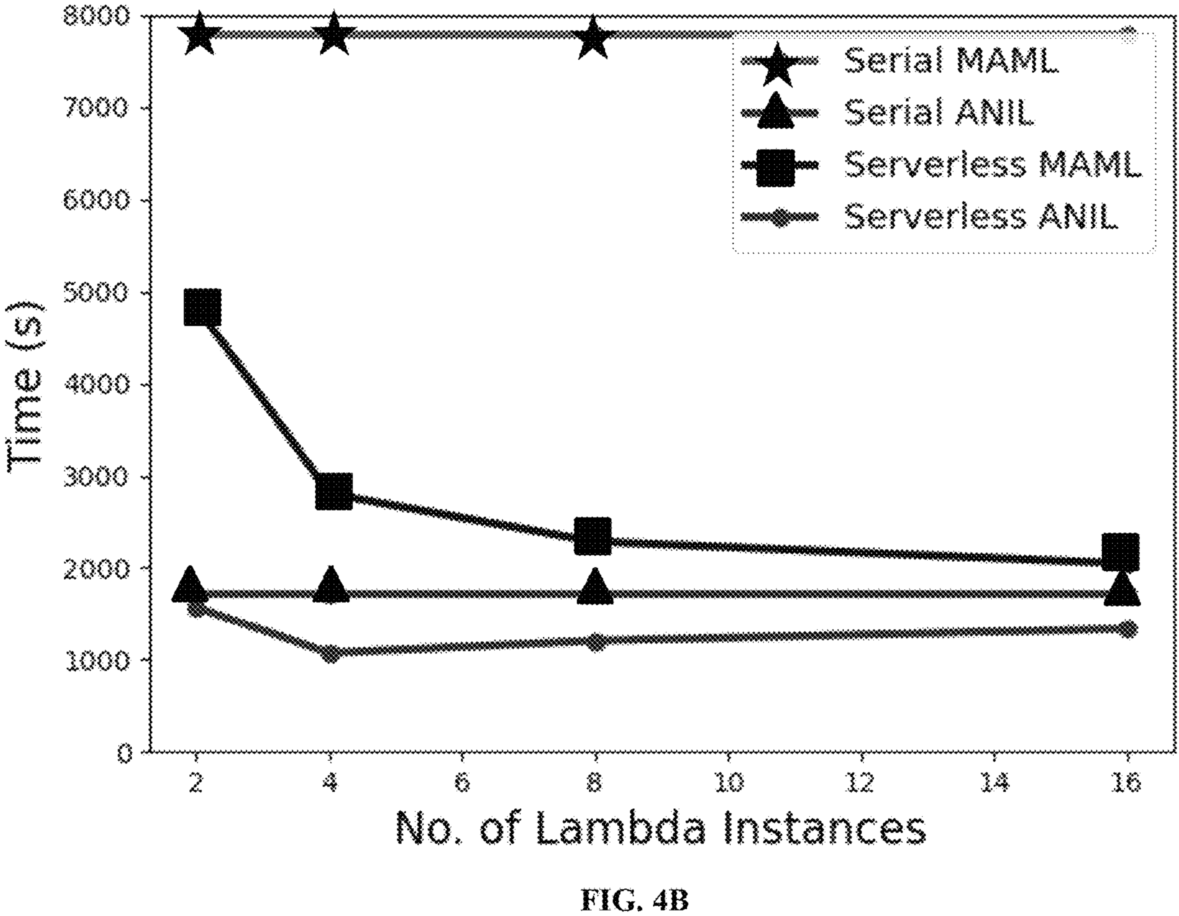
Figure 4C:
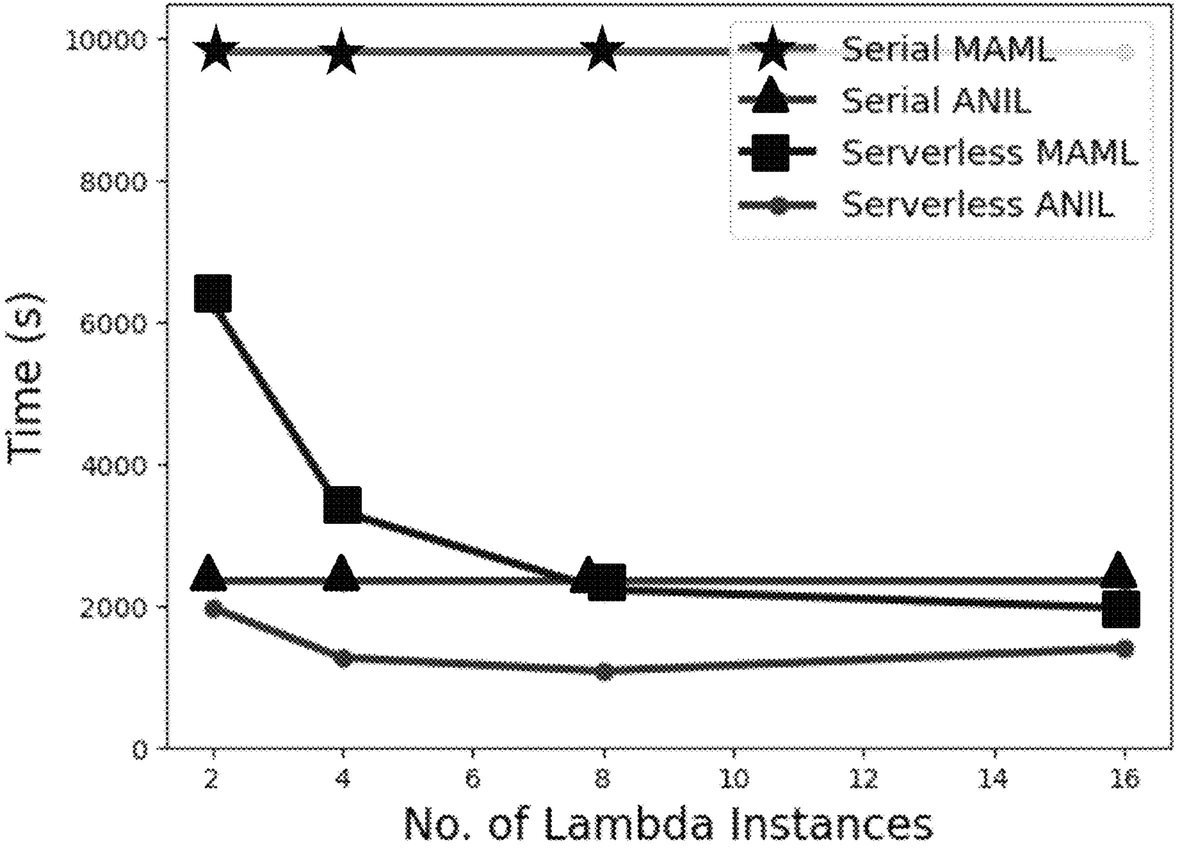
Figure 4D:
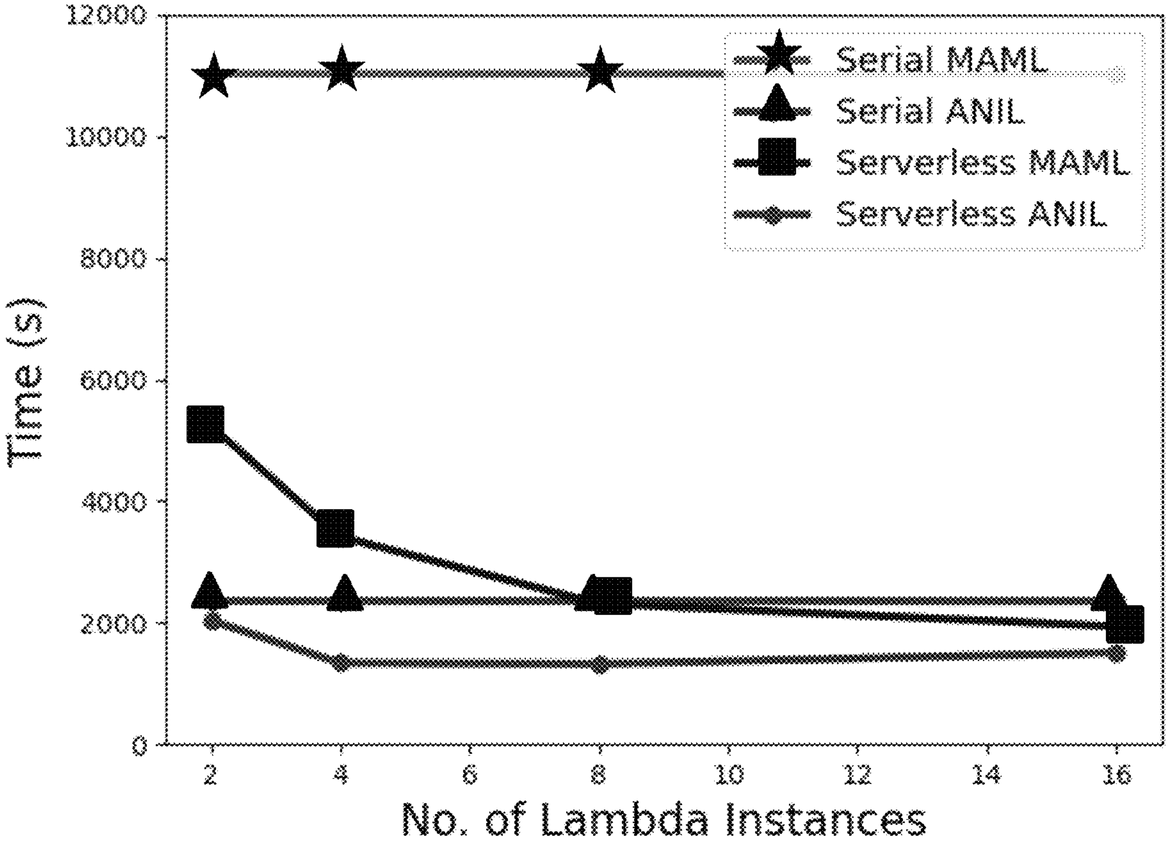

The MetaFaas architecture (the system 100) disclosed is explained below with 3 popular conventional meta-learning architectures, namely, Model-Agnostic Meta-Learning (MAML), Almost No Inner Loop (ANIL) and ALFA, followed by the compute-efficient architecture, eALFA disclosed by the method 200 herein. Meta-learning is a few-shot learning paradigm to efficiently learn on unseen tasks given very few samples during training. The MAML tries to find a good initialization point for the model parameters. MAML performs two optimizations via two loops: Outer Loop and Inner Loop. In Inner Loop, MAML performs task-specific updates. It performs gradient update steps using Stochastic Gradient Descent (SGD) for input training samples of each task. ANIL is a simplified version of MAML, where the parameter updates of the inner loop are considered redundant. ANIL thus removes the inner loop updates for the network body and applies inner loop adaptation only to the head. This is because, the head is task-specific, and thus varies each inner loop iteration to align with different classes in each task. Because of its similarity with MAML, ANIL can easily be adapted to the serverless architecture, similar to MAML. The tasks in the meta-batch are distributed across multiple workers. However, since computation in the inner-loop is already optimized (only the head layer is updated), a very high speed-up is not expected in the distributed serverless setup for ANIL. ALFA is a gradient-based meta-learning algorithm, which focuses on adaptive learning of hyperparameters for fast adaptation, i.e., inner-loop optimization. It achieves this by making the weight decay and learning rate hyper-parameters adaptive, to the current state of the base learner. ALFA is initialization-agnostic because the initial weights $\theta$ for $f_\theta$ do not need to be updated throughout the training process, i.e., ALFA can be trained to adapt from any given initialization (e.g., random initializations). Naturally, ALFA can be used with a technique such as MAML that searches for the best model initialization to get even better performance.

eALFA: The eALFA disclosed herein is a compute-efficient variant of ALFA. The ALFA algorithm is known to have a huge computational overhead due to the inclusion of an additional neural network in the training loop as depicted in FIG. 3A. The challenge is to reduce the computational overhead while maintaining the advantage of rapid learning using ALFA. The method 200 modifies the ALFA architecture by freezing layers of the neural network (NN) in the inner-loop training. A CCA similarity known in the art is used to validate the training. The ALFA is trained on FC100 public dataset using a 4-layered CNN (CONV4) having a classifier layer as a head for 100 iterations. In each iteration, the CCA similarity was computed for the model parameters before and after the inner loop update. FIG. 3C shows the results of CCA Similarity experiments on the CONV4 model. As seen, the CCA score for all four layers is above 0.9, meaning that the weights are not updated significantly in the inner loop. However, the head layer shows a low CCA score. This is because the classes change for every input task, thus the head layer has to adapt to the classes. Thus, this indicates that during the inner loop, all the layers except the head layer can be frozen, and still achieve nearly the same accuracy on the input dataset as shown in equation 1 below and depicted in FIG. 3B.

$$\theta^{l_k}_{\mathcal{T}_i} = \beta_{l_k}\theta^{l_k}_{\mathcal{T}_i} - \alpha_{l_k}\nabla_\theta \mathcal{L}^{\mathcal{D}_{train}}_{\theta_{l_{\mathcal{T}_i}}}(f_\theta),\ \forall\ k = \{1.2\ \ldots\ N\} \tag{1}$$

$$\theta^{head}_{\mathcal{T}_i} = \beta_{head}\theta^{head}_{\mathcal{T}_i} - \alpha_{head}\nabla_\theta \mathcal{L}^{\mathcal{D}_{train}}_{\theta_{l_{\mathcal{T}_i}}}(f_\theta)$$

Only the head layer is updated as in equation 2 below.

$$\theta^{l_k}_{\mathcal{T}_i} = \theta^{l_k}_{\mathcal{T}_i},\ \forall\ k = \{1, 2\ \ldots\ .N\} \tag{2}$$

$$\theta^{head}_{\mathcal{T}_i} = \beta_{head}\theta^{head}_{\mathcal{T}_i} - \alpha_{head}\nabla_\theta \mathcal{L}^{\mathcal{D}_{train}}_{\theta_{l_{\mathcal{T}_i}}}(f_\theta)$$

Pseudo code 2 below provides a pseudocode for eALFA.

Pseudo code 2 - Efficient ALFA (eALFA)

Require: A Task Distribution P(T), learning rate $\gamma$

1: Randomly initialize $\theta$ and $\phi$

2: while not DONE do

3: Sample batches of tasks $\mathcal{T}_i \sim \mathcal{P}(\mathcal{T})$

4: for tasks $\mathcal{T}_i$ do

5: Initialize $\theta_{\mathcal{T}_i}, 0 = \theta$

6: $\theta_1, \theta_2, \ldots, \theta_{head} = \theta_{\mathcal{T}_i,0}$

7: Randomly sample two sets: $\mathcal{D}_{train}, \mathcal{D}_{test} \in \mathcal{T}_i$ 8: for adaptation steps j := 0 to AS − 1 do 9: Compute loss $\mathcal{L}^{\mathcal{D}_{train}}_{\theta_{l_{\mathcal{T}_i}}}(f_{\theta_{\mathcal{T}_i,0}})$ w.r.t. $\mathcal{K} \in \mathcal{D}_{train}$ 10: Compute task-specific hyperparameters:

11: $(\alpha_{\mathcal{T}_i,j}, \beta_{\mathcal{T}_i,j}) = g_\phi\left(\nabla\theta_{head}\mathcal{L}^{\mathcal{D}_{train}}_{\theta_{l_{\mathcal{T}_i}}}(f_{\theta_i,j}), \theta_{head,j}\right)$ 12: Perform gradient descent on the head layer:

13: $\theta_{head,j+1} = \beta_{\mathcal{T}_i,j}\theta_{head,j+1} - \alpha_{\mathcal{T}_i,j}\mathcal{L}^{\mathcal{D}_{train}}_{\theta_{l_{\mathcal{T}_i}}}(f_{\mathcal{T}_i,j})$ 14: end for 15: Compute loss $\mathcal{L}^{\mathcal{D}_{test}}_{\mathcal{T}_i}\left(f_{\theta'_{\mathcal{T}_i,j}}\right)$ w.r.t. $\mathcal{K} \in \mathcal{D}_{test}$ 16: Update weights: $\theta'_{\mathcal{T}_i,j} = \theta'_{\mathcal{T}_i,AS}$ 17: end for 18: Perform gradient-descent on regularizer:

19: $\phi := \phi - \gamma\nabla\phi\sum\mathcal{T}_i\ \mathcal{L}^{\mathcal{D}_{test}}_{\mathcal{T}_i}\left(f_{\theta'_{\mathcal{T}_i}}\right))$ 20: end while EXPERIMENT SETUP: Results of the MetaFaas architecture are benchmarked for multiple quasi-benchmark datasets such as Omniglot, Mini-Imagenet, FC100, CUBirds in the field of meta learning. The performance of MetaFaas (serverless architecture) has been compared with meta-learning architectures on bare-metal. For the serverless architecture setup, AWS lambda instances (serverless instances) are used. The performance is studied by varying the number of instances (1, 2, 4, 8, 16) to increase parallelism during the training process. The bare-metal experiments are conducted on a Linux CentOS7 server, with 256 GB RAM and 56 core CPUs. The AWS lambda instance has 6 cores, and a maximum memory of 10 GB can be allocated to the instance. Memory usage varies according to the input task and can be varied in the range of 128 MB to 10 GB to avoid additional costs. Each lambda instance can execute for 15 minutes once it is instantiated. The meta batch size is fixed to 16 (i.e., there are 16 tasks in each batch), and experiments are conducted with 1shot-5ways and 5shots-1way. The Mini-Imagenet dataset comprises 60K image of size 84×84. The dataset has 64 training classes, 16 validation classes and 20 testing classes, each having 600 samples. Omniglot dataset is made up of 50 alphabets belonging to 1623 character classes, each containing 20 samples. The default setup of the learn2learn library3 has 1100 classes in the train set, 100 classes for validation and 428 classes in the test set. This default setup is used for experiments. The CU-Birds dataset contains 11,788 images of 200 bird species. The data was split into 200 classes that are divided into 100, 50 and 50 for meta-training, meta-validation, and meta-testing, respectively. FC100 dataset is a few-shot classification dataset built on CIFAR100. The dataset was split into 100 classes which are divided into 60 classes for meta-training, 20 classes for meta-validation, and 20 classes for meta-testing, with each class containing 20 images.

RESULTS AND DISCUSSION: An extensive study has been conducted with multiple meta-learning architectures (MAML, ANIL, ALFA and eALFA), across image datasets from varied domains. The performance on bare metal has been benchmarked, where the algorithms were trained in a serial setup, i.e., the model was trained sequentially on tasks in a meta-batch using two configurations (1) 5 ways, 1 shot (2) 5 ways, 5 shots, on increasing number of serverless lambda instances (1, 2, 4, 8).

Performance acceleration on serverless: In this experiment, the performance of MAML and ANIL is compared using the serverless setup against a serial implementation on bare-metal. The training time has been plotted achieved for MAML running in a serial manner on a bare-metal setup is plotted and compared with the serverless execution of the MAML and ANIL architectures on an increasing number of serverless instances on 4 datasets as depicted in FIGS. 4A, 4B, 4C and 4D. As the number of instances increase, it is observed that serverless MAML achieves an acceleration of more than 5× as compared to serial MAML. Serverless ANIL performs even better. This is because by default ANIL is computationally optimal as compared to MAML. However, as the number of instances goes to 16, it can be seen that there is an increase in the training time for small datasets, because the communication overhead for consolidating gradients at the end of every epoch increases. Thus, there is a trade-off between the speed-up in training time with scalability and communication overhead. The performance of the eALFA disclosed is compared with the conventional ALFA and indicates eALFA is computationally optimal leading to a significant reduction in the training time. As observed from the graphs of FIGS. 4A, 4B, 4C and 4D, ALFA show an improvement in training time with an increase in serverless instances, while eALFA outperforms ALFA on a serverless setup. As discussed earlier, eALFA updates only the head layer of the network and as a result reduces the compute overhead. This also leads to a further reduction in training time. From FIGS. 4A, 4B, 4C and 4D, it is further inferred that as the difficulty of input tasks increases, the speedup gained on a serverless platform also increases. A speedup of more than 5× is obtained for MAML and ALFA meta-learning algorithms for datasets such as Mini-Imagenet and CUBirds. A communication overhead for ANIL and eALFA is noticed for easier datasets such as Omniglot. However, in general, a speedup of 2×-4× for MAML and ALFA algorithms was achieved, and a speedup of 1.5×-2.5× for ANIL and eALFA algorithms was achieved. Table 1 presents the comparison between the accuracy achieved on a serial bare-metal setup versus the accuracy observed across different serverless instances for Omniglot (OG) and FC100 (FC) datasets, for 1 shot (1s) and 5 shot (5s). It is observed that the model performance is not affected significantly even when subject to multiple instances. Furthermore, a huge speedup is achieved on different meta-learning architectures trained across various datasets.

TABLE 1

| | | MAML | | | |
|---|---|---|---|---|---|
| 2w | 4w | 8w | 16w | Sr | |
| OG 1s | 0.92 | 0.91 | 0.92 | 0.92 | 0.94 |
| OG 5s | 0.94 | 0.92 | 0.91 | 0.91 | 0.97 |
| FC 1s | 0.36 | 0.35 | 0.36 | 0.35 | 0.36 |
| FC 5s | 0.45 | 0.44 | 0.45 | 0.45 | 0.49 |
| | | ANIL | | | |
| 2w | 4w | 8w | 16w | Sr | |
| OG 1s | 0.87 | 0.86 | 0.87 | 0.85 | 0.94 |
| OG 5s | 0.89 | 0.89 | 0.88 | 0.87 | 0.96 |
| FC 1s | 0.33 | 0.32 | 0.34 | 0.35 | 0.38 |
| FC 5s | 0.35 | 0.34 | 0.34 | 0.34 | 0.47 |
| | | ALFA | | | |
| 2w | 4w | 8w | 16w | Sr | |
| OG 1s | 0.94 | 0.95 | 0.84 | 0.95 | 0.96 |
| OG 5s | 0.99 | 0.99 | 0.98 | 0.98 | 0.99 |
| FC 1s | 0.39 | 0.37 | 0.38 | 0.37 | 0.41 |
| FC 5s | 0.50 | 0.51 | 0.51 | 0.50 | 0.53 |
| | | eALFA | | | |
| 2w | 4w | 8w | 16w | Sr | |
| OG 1s | 0.96 | 0.96 | 0.96 | 0.96 | 0.96 |
| OG 5s | 0.99 | 0.99 | 0.99 | 0.99 | 0.99 |
| FC 1s | 0.34 | 0.34 | 0.34 | 0.35 | 0.37 |
| FC 5s | 0.49 | 0.49 | 0.49 | 0.49 | 0.50 |

ANALYTICAL MODEL: The analytical model disclosed herein captures the cost/performance trade-off for multiple configurations of meta-learning architectures, both on bare-metal and cloud, and empirically validate the output of the analytical model of the present disclosure. Given a meta-learning algorithm 'A', for which the task size is 't' model backbone is 'm' let a number of workers instantiated be 'w'. Furthermore, let 'I' be the number of iterations required for convergence. Assume that the training function on lambda is invoked 'x' times, where:

$$x = \frac{1}{\text{No. of epochs completed in 15 min}} \tag{3}$$

a generalized equation of the analytical model for a given meta-learning algorithm 'A' is given as:

$$FaaS(w)\text{:}\, x\left[t_s(w)C_F(w) + \frac{I}{x}\left[\frac{MBS}{w}\left(\frac{t}{B_{S3}} + AS\times IL(w) + B_k(w)\right) + \frac{(3w-2)}{c_3}\frac{m}{B_{S3}} + L_{S3}\right] + S_C(w)\right] + c \tag{4}$$

where $t_s(w)$ is the startup time of a lambda instance, $C_F(w)$ and $S_C(w)$ are the loading and saving model time, MBS is the meta batch size, AS is the number of adaptation steps in the inner loop of the meta-learning algorithm, IL (w) is the inner loop update time that varies across the different meta-learning algorithms. $B_{S3}$, $L_{S3}$ is the bandwidth and latency observed on S3. Lastly, c is a constant and Bx (w) is the time required for back-propagating gradients and updating model parameters after each iteration. Again, the equation for $B_k$(w) varies across the meta-learning algorithms. The graphs in FIGS. 4A, 4B, 4C and 4D clearly depict the trade-off between training the architecture on bare-metal and serverless instances, and the threshold beyond which the benefits of training are not derived on serverless instances owing to the communication overhead.

Figure 5A:
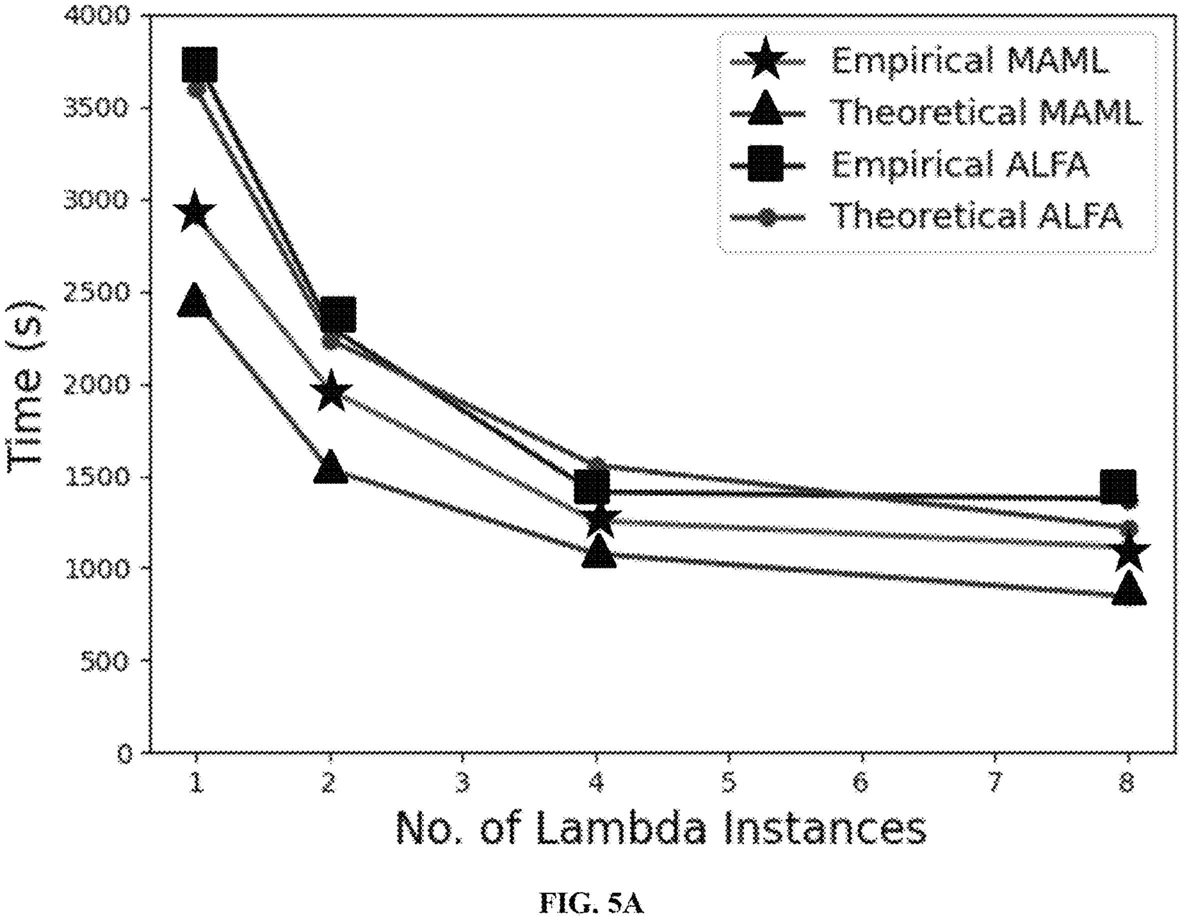
FIGS. 5A through 5D illustrates empirical vs theoretical training time of meta learning on system of FIG. 1B using an analytical model on FC100 5w1s dataset, in accordance with some embodiments of the present disclosure.
Figure 5B:
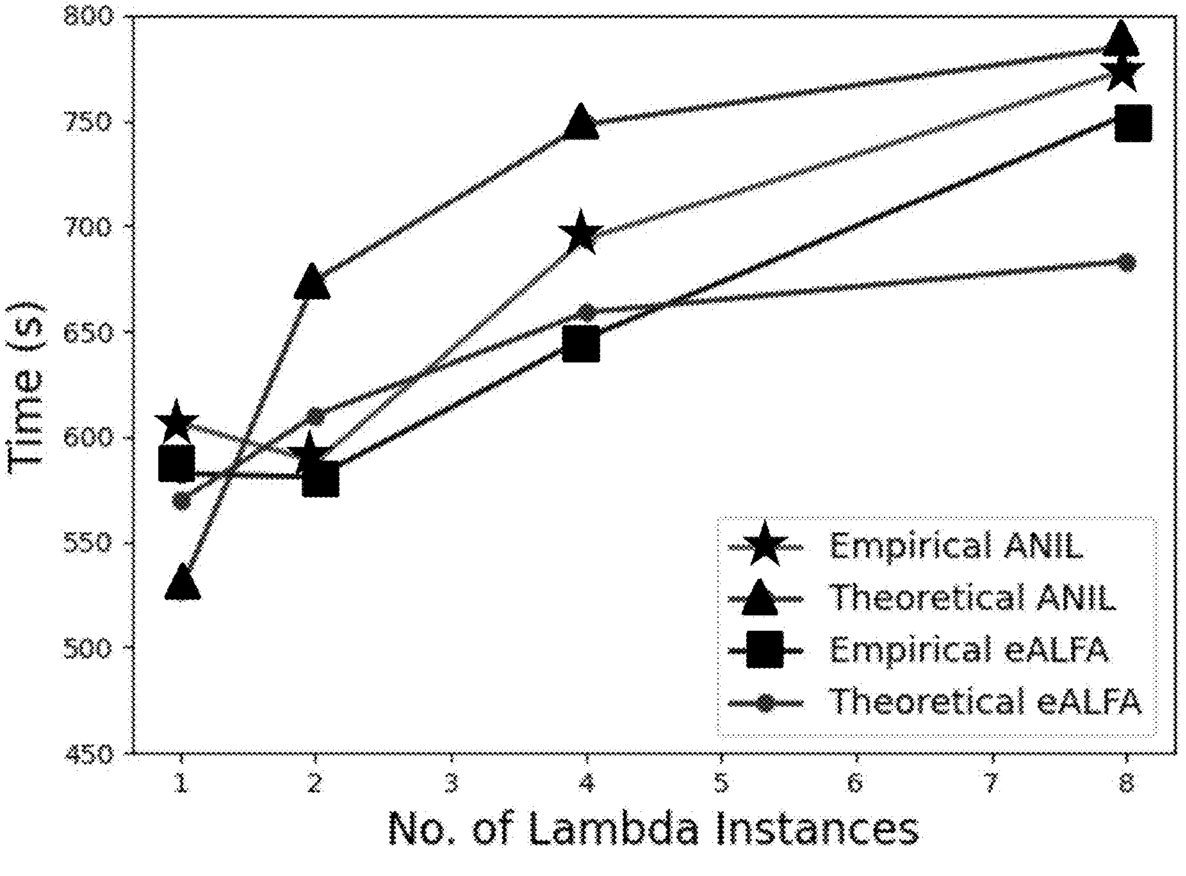
Figure 5C:
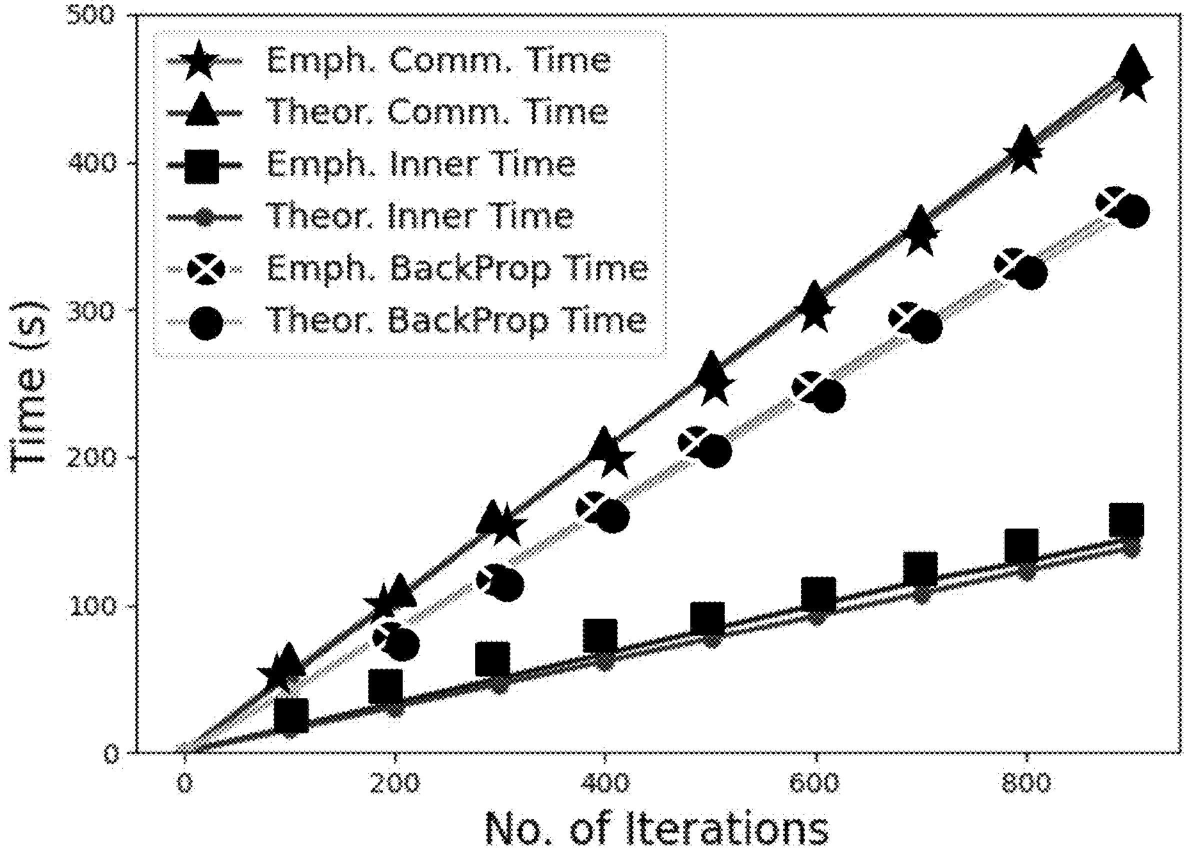
Figure 5D:
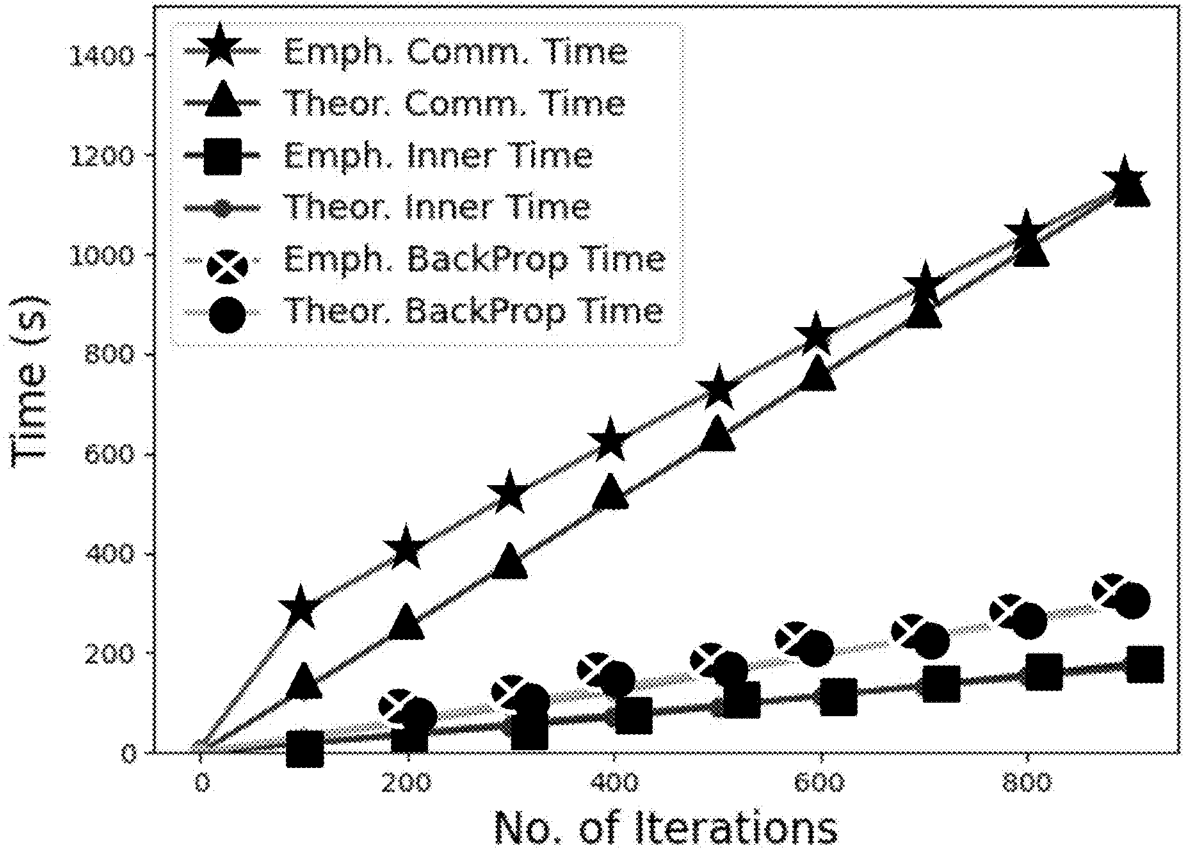

Derivation of the communication cost for each worker: Workers on FaaS do not have any communication channel amongst themselves on invoking the lambda function, thus rendering it infeasible to accumulate gradients learned on each instance using conventional methods. The issue is addressed by making use of a disk-based object storage device such as S3 which enables read and write operations of the gradients. However, the analytical model can easily be extended to other storage systems as well. The communication works as follows: (1) Each instance stores the gradients/current state in a temporary file and uploads it to S3. (2) One worker iterates over all the temporary files and merges them into a single file. (3) All other workers, except for the worker that has already read the file, read the final merged file from the storage system. (4) Lastly, the model parameters in each of the workers are updated with the latest aggregated parameters. Thus, the equation for the communication time is given by:

$$comm_{time}(w) = (3w-2)\frac{t}{B_{S3}}\frac{tI}{C_S} \quad (5)$$

where, $C_S$ is a scaling factor that varies across the meta-learning algorithms. However, the empirical results may vary depending on the size of the input dataset. And hence, the scaling factor is incorporated in the above equation for 1) number of workers, and 2) dataset size. Using the suggested constants from Table 2, the analytical model approximates quite well to empirical results as seen from the graphs in FIGS. 5A, 5B, 5C, and 5D. FIGS. 5A and 5B depict how the analytical model scales on the FC100 dataset across an increasing number of instances on the 4 meta-learning algorithms. As can be seen in FIGS. 5C and 5D, the analytical model also scales well over increasing iterations for the communication, inner-loop, and back-propagation time. Thus, the analytical model is generic across gradient based meta-learning architectures and provides useful insights into training cost incurred with scale.

TABLE 2

| Symbol | Configurations | Values |
|---|---|---|
| ts (w) | w = 1, 2, 4, 8, 16 | (1.2 ± 0.1)s |
| $B_{S3}$ | Amazon S3 | Bandwidth (65 ± 7)MB/s |
| $L_{S3}$ | Amazon S3 | Latency (8 ± 2) × 10 − 2 s |
| MBS | Meta-batch-size | 4, 16, 32 |
| AS | Adaptation Steps | 1, 3, 5 |
| I | Number of iterations | 1k, 10k, 30k |

The execution time in the analytical model varies slightly for each of the gradient-based meta-learning algorithms. Equation 4 above is largely generic, with changes to IL(w) and BK(w). The communication time is architecture agnostic, and dependent on the size of input task, model, and number of instances invoked. The present disclosure now discusses the cost (in dollars) incurred during training. The cost is calculated as a scaling factor of execution time and memory utilized on lambda instances. Additional cost is computed as a function of the read/write operations on S3, and size of data transferred from S3 to EFS using, for example AWS DataSync™.

The analytical model is also capable of providing an accurate estimate of the cost incurred across a range of datasets, algorithms, and training iterations. The analytical model equations are outlined for each of the meta learning architectures and provided by Pseudo code 3 below.

Pseudo code 3:

```
1. Input: Dataset, MBS, Cost(th), Training-iter(th), params
2. Output: Optimal A(i)
  a. While [A in {A1, A2, A3 . . . } ]
       i. // returns the analytical model for a metalearining
          algorithm
        ACostModel = Getcostmodel (A[i])
       ii. // Determines no of instances required using analytical
          model
        Faas (W) ← ACostModel (Dataset, MBS, Training-iter(th),
     params)
       iii. // Determines the cost incurred by the algorithm for the
          data
        Cost (A[i]) = Faas (W) * cost(instance)
     EndWhile
3. if (Cost(A[i])) < = Cost(th))
  a. Return SelectedAlgo
```

TABLE 3

| Dataset | MAML | ANIL | ALFA | eALFA |
|---|---|---|---|---|
| Mini-Imagenet | 4.96 × (16w) | 2.16 × (8w) | 4.93 × (16 × ) | 9.14 × (8w) |
| CUBirds200 | 5.68 × (16w) | 1.79 × (8w) | 5.04 × (16 × ) | 9.39 × (8w) |

The hierarchical nature of gradient-based meta-learning architectures enables them to scale well on a serverless setup. Limited memory and duration of serverless instances render such architectures well suited for re-training meta-learning architectures on a few shots of data. This leads to a significant reduction in the overall training time (speed-up of 5× for large datasets such as Mini-Imagenet as depicted in Table 3). The eALFA achieves a speed-up of 9× on the serverless instances as compared to the original ALFA on a bare-metal serial setup. The analytical model as implemented by the system and method of the present disclosure is largely generic and can be adapted to gradient-based meta-learning architectures with minor variations.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Thus, the method and system disclosed provide cost-performance optimal deployment of gradient based meta-learning architectures using MetaFaaS. Further, the efficient version of ALFA (eALFA) meta-learning algorithm is used to train the based models, which provides improved accuracy and optimal training times. Furthermore, the analytical model disclosed enables analyzing cost-performance tradeoff among the plurality of meta learning architectures based on the size of a task among the plurality of tasks, the base model, the number of the plurality of serverless instances invoked, and the number of iterations required for convergence of the base model being trained.

It is to be understood that the scope of the protection is extended to such a program and in addition to a computer-readable means such computer-readable storage means contain program-code means for implementation of one or more steps of the method, when the program runs on a server or mobile device or any suitable programmable device. The hardware device can be any kind of device which can be programmed e.g., any kind of computer like a server or a personal computer, or the like, or any combination thereof. The device may also include means which could be hardware means like an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for meta learning using distributed training, the method comprising:

initializing, via one or more hardware processors, a base model to be trained using a serverless architecture;

spawning, via the one or more hardware processors, a plurality of serverless instances of the serverless architecture and sharing a copy of the base model with each of the plurality of serverless instances; and generating, via the one or more hardware processors, a trained model via an iterative training process using a gradient-based meta learning approach applied on the copy of the base model via the plurality of serverless instances, the iterative training process comprising:

generating and adding to a task pool, a plurality of meta batches each comprising a plurality of tasks, wherein the plurality of tasks in each of the plurality of meta batches is received at irregular time intervals;

randomly sampling a meta batch from amongst the plurality of meta batches from the task pool;

uniformly distributing and loading the plurality of tasks from the sampled meta batch across the plurality of serverless instances;

computing a training time for the base model using an analytical model for a meta learning architecture among a plurality of meta learning architectures, wherein the analytical model enables analyzing a cost-performance tradeoff among the plurality of meta learning architectures based on a size of a task among the plurality of tasks, the base model, a number of the plurality of serverless instances spawned, and a number of iterations required for convergence of the base model being trained;

generating a local model by each of the plurality of serverless instances by training the copy of the base model using a corresponding task loaded on each of the plurality of serverless instances and updating one or more task specific parameters for the copy of the base model at a current level of the iterative training process;

computing a plurality of gradients corresponding to each of the local models from the updated one or more task specific parameters at the current level of the iterative training process, wherein the plurality of gradients is stored in a cloud storage-based communication channel;

aggregating the plurality of gradients corresponding to the local model;

updating the base model in accordance with the aggregated plurality of gradients; and sharing a copy of the updated base model with each of the plurality of serverless instances for successive level of the iterative training process, wherein the iterative training process terminates once the base model converges to provide the trained model.

2. The processor implemented method of claim 1, wherein the step of uniformly distributing the plurality of tasks comprises sharing one task per serverless instance among the plurality of serverless instances spawned, and assigning multiple tasks to a single serverless instance, based on the communication overhead incurred by spawning additional serverless instances.

3. The processor implemented method of claim 1, further comprising modifying an Adaptive Learning of hyperparameters for Fast Adaptation (ALFA) technique for meta learning by freezing all Neural Network (NN) layers in the ALFA except a head layer in an inner loop of the iterative training process of the base model.

4. A system for meta learning using distributed training, the system comprising:

a memory storing instructions;

one or more Input/Output (I/O) interfaces; and one or more hardware processors coupled to the memory via the one or more I/O interfaces, wherein the one or more hardware processors are configured by the instructions to:

initialize a base model to be trained using a serverless architecture;

spawn a plurality of serverless instances of the serverless architecture and sharing a copy of the base model with each of the plurality of serverless instances; and generate a trained model via an iterative training process using a gradient-based meta learning approach applied on the copy of the base model via the plurality of serverless instances, the iterative training process comprising:

generating and adding to a task pool, a plurality of meta batches each comprising a plurality of tasks, wherein the plurality of tasks in each of the plurality of meta batches is received at irregular time intervals;

randomly sampling a meta batch from amongst the plurality of meta batches from the task pool;

uniformly distributing and loading the plurality of tasks from the sampled meta batch across the plurality of serverless instances;

computing a training time for the base model using an analytical model for a meta learning architecture among a plurality of meta learning architectures, wherein the analytical model enables analyzing a cost-performance tradeoff among the plurality of meta learning architectures based on a size of a task among the plurality of tasks, the base model, a number of the plurality of serverless instances spawned, and a number of iterations required for convergence of the base model being trained;

generating a local model by each of the plurality of serverless instances by training the copy of the base model using a corresponding task loaded on each of the plurality of serverless instances and updating one or more task specific parameters for the copy of the base model at a current level of the iterative training process;

computing a plurality of gradients corresponding to each of the local models from the updated one or more task specific parameters at the current level of the iterative training process, wherein the plurality of gradients is stored in a cloud storage-based communication channel;

aggregating the plurality of gradients corresponding to the local model;

updating the base model in accordance with the aggregated plurality of gradients; and sharing a copy of the updated base model with each of the plurality of serverless instances for successive level of the iterative training process, wherein the iterative training process terminates once the base model converges to provide the trained model.

5. The system of claim 4, wherein the one or more hardware processors are further configured by the instructions to uniformly distribute the plurality of tasks by sharing one task per serverless instance among the plurality of serverless instances spawned, and assigning multiple tasks to a single serverless instance, based on the communication overhead incurred by spawning additional serverless instances.

6. The system of claim 4, wherein the one or more hardware processors are further configured by the instructions to modify an Adaptive Learning of hyperparameters for Fast Adaptation (ALFA) technique for meta learning by freezing all Neural Network (NN) layers in the ALFA except a head layer in an inner loop of the iterative training process of the base model.

7. One or more non-transitory machine-readable information storage mediums comprising one or more instructions which when executed by one or more hardware processors cause:

initializing a base model to be trained using a serverless architecture;

spawning a plurality of serverless instances of the serverless architecture and sharing a copy of the base model with each of the plurality of serverless instances; and generating a trained model via an iterative training process using a gradient-based meta learning approach applied on the copy of the base model via the plurality of serverless instances, the iterative training process comprising:

generating and adding to a task pool, a plurality of meta batches each comprising a plurality of tasks, wherein the plurality of tasks in each of the plurality of meta batches is received at irregular time intervals;

randomly sampling a meta batch from amongst the plurality of meta batches from the task pool;

uniformly distributing and loading the plurality of tasks from the sampled meta batch across the plurality of serverless instances;

computing a training time for the base model using an analytical model for a meta learning architecture among a plurality of meta learning architectures, wherein the analytical model enables analyzing a cost-performance tradeoff among the plurality of meta learning architectures based on a size of a task among the plurality of tasks, the base model, a number of the plurality of serverless instances spawned, and a number of iterations required for convergence of the base model being trained;

generating a local model by each of the plurality of serverless instances by training the copy of the base model using a corresponding task loaded on each of the plurality of serverless instances and updating one or more task specific parameters for the copy of the base model at a current level of the iterative training process;

computing a plurality of gradients corresponding to each of the local models from the updated one or more task specific parameters at the current level of the iterative training process, wherein the plurality of gradients is stored in a cloud storage-based communication channel;

aggregating the plurality of gradients corresponding to the local model;

updating the base model in accordance with the aggregated plurality of gradients; and sharing a copy of the updated base model with each of the plurality of serverless instances for successive level of the iterative training process, wherein the iterative training process terminates once the base model converges to provide the trained model.

8. The one or more non-transitory machine-readable information storage mediums of claim 7, wherein the step of uniformly distributing the plurality of tasks comprises sharing one task per serverless instance among the plurality of serverless instances spawned, and assigning multiple tasks to a single serverless instance, based on the communication overhead incurred by spawning additional serverless instances.

9. The one or more non-transitory machine-readable information storage mediums of claim 7, wherein the one or more instructions which when executed by the one or more hardware processors further cause modifying an Adaptive Learning of hyperparameters for Fast Adaptation (ALFA) technique for meta learning by freezing all Neural Network (NN) layers in the ALFA except a head layer in an inner loop of the iterative training process of the base model.

* * * * *